July 26, 1966 A. J. SAPONARO ET AL 3,262,209

OSCILLOGRAM DATA READER

Filed April 7, 1964

INVENTORS
ANTHONY J. SAPONARO
DILWYN J. HERBERT
BY Harry M. Saragovitz, E. J. Kelly & H. Berl United States Patent Office 3,262,209

Patented July 26, 1966

3,262,209

OSCILLOGRAM DATA READER

Anthony J. Saponaro, Perryville, Md., and Dilwyn J. Herbert, Jim Thorpe, Pa., assignors to the United States of America as represented by the Secretary of the Army Filed Apr. 7, 1964, Ser. No. 358,132
2 Claims. (Cl. 33—1)

The invention described herein may be manufactured and used by or for the Government for governmental purposes, without the payment to us of any royalty thereon.

The present invention relates to simple apparatus and a method for interpreting data portrayed on an oscillograph.

Previously, oscillogram data reduction involved many time consuming steps. These steps included confining maximum and minimum values by drawing parallel lines, measuring and averaging these values, and subtracting the average value from a zero reference trace to obtain a deflection.

Utilizing the present reader, the deflection is read directly in one step. This decreases data reduction time to ⅓ of the time which would be required without use of the present invention.

Figure 2:
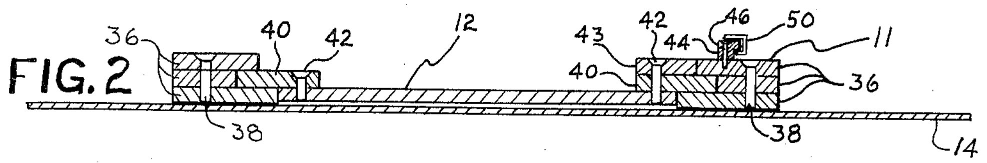
FIG. 2 is a detail along line 2—2 of FIG. 1.
Figure 1:
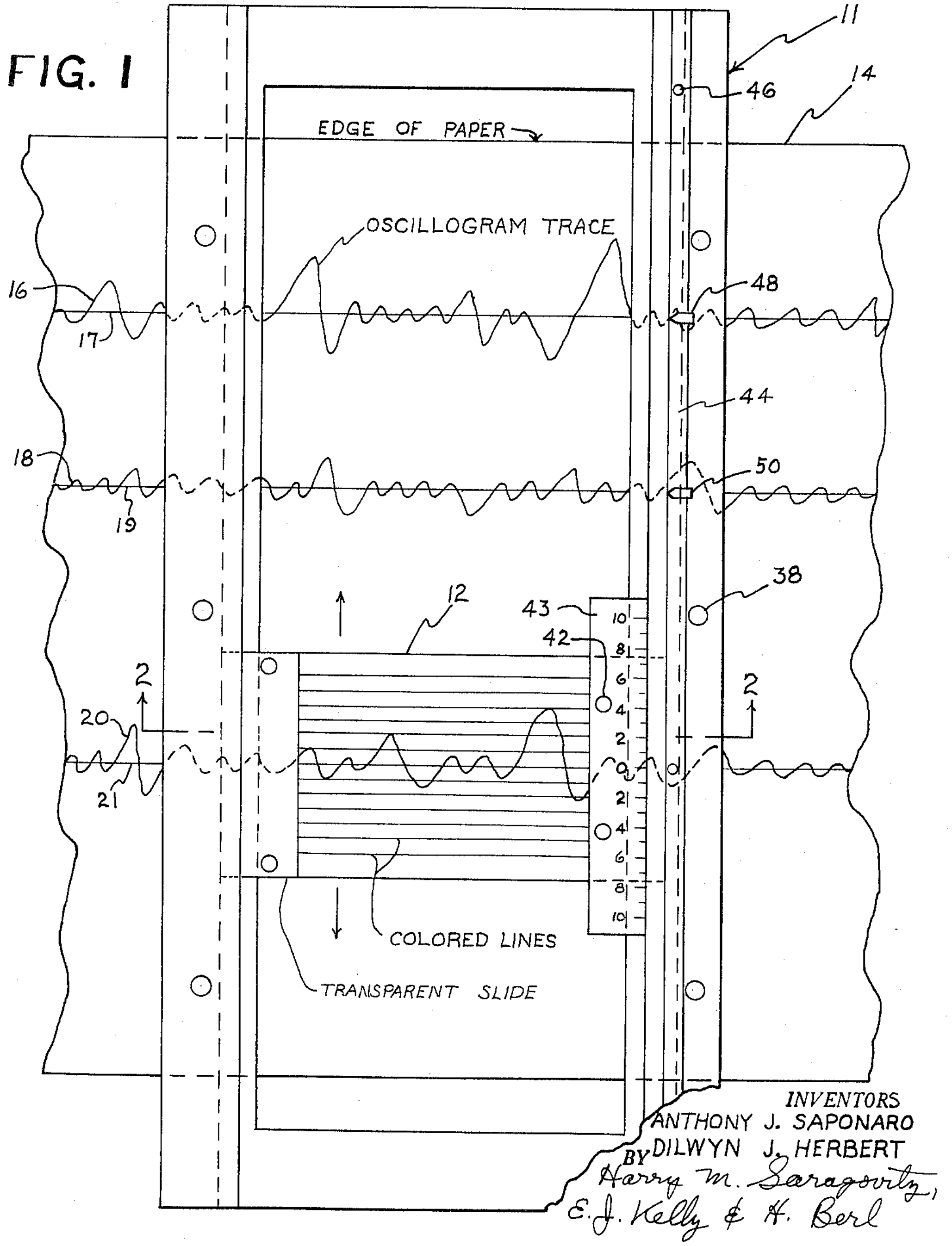
FIG. 1 is a plan view of the present invention.

The present oscillogram reader comprises a frame 11 having a transparent member 12 slidably mounted thereon. Paper 14, having one or more oscillogram traces 16, 18, 20, generally centered about axes 17, 19, 21 respectively, is placed beneath the reader. Transparent slide member 12 has a zero reference line 0, colored white for example. Pairs of variously colored lines 2, 4, 6, 8, 10 are equally spaced on opposite sides of zero reference line 0. As exemplary, the pair of lines 2 may be red, the pair of lines 4 may be yellow, etc.

FIG. 2 illustrates details of frame 11 comprising members 36 secured together by screws 38. Member 12 is slidably mounted in frame 11 by components 40 which are secured together, and to transparent slide member 12, by screws 42. The arrangement permits member 12 to be moved back-and-forth as guided by frame members 36. Indicia plate 43 is also secured to transparent slide member 12 by screws 42 and has reference numbers 0, 2, 4, 6, 8, 10 printed thereon.

A marker rail 44 is secured along an edge of frame 11 by screws 46. Marker rail 44 has a plurality of markers 48, 50 slidably and frictionally secured thereto.

*Operation*

The present invention is used by placing a section of oscillograph paper 14 on a planar surface and placing the oscillogram data reader 11 thereover. Transparent slide member 12 is moved over an oscillograph trace which is to be examined, as illustrated at 20 for example. The generally centered axis 21 (or 17, 19) may or may not be recorded on the oscillogram trace. The center line 0 is automatically centered with respect to the section of oscillogram trace to be examined in the following manner. The plus and minus values of the trace stand out vividly by comparison with the pairs of variously colored lines 2, 4, 6, 8, 10. If the trace touches red lines on opposite sides of null line 0, for example, the magnitude of the deviations from null line 0 is readily ascertained by the pairs of colored lines 2, 4, 6, 8, 10.

Markers 48, 50 become useful when several traces on the same paper are likely to be confused with one-another. These markers, once set for certain trace zeroes, identify the various zero references instantly as the oscillograph paper is moved repeatedly beneath the reader for continuing examination of the trace.

We claim:

1. Apparatus to facilitate reading data on an oscillogram comprising a frame to be placed over a paper bearing oscillogram traces to be examined, a transparent slide reciprocably mounted on said frame, there being substantially parallel reference lines on said transparent slide, said lines extending transversely to the direction of reciprocation of said slide on said frame, said slide carrying an indicia plate adjacent one end of the slide and adjacent the frame, said indicia plate bearing numbers extending in consecutive order in opposite directions from a centrally disposed zero index, said reference lines being aligned with the reference numbers with the centermost reference line aligned with the zero index forming a zero reference line of one color, and additional pairs of reference lines, with each pair being distinctively colored and the lines of each pair being disposed on opposite sides of said zero reference line, and at least one marker mounted on said frame and slidable to a position to indicate an oscillogram trace other than the trace under examination.

2. Apparatus as in claim 1 wherein said reference lines are equally spaced.

References Cited by the Examiner

UNITED STATES PATENTS

| | | | |
|---|---|---|---|
| 1,356,971 | 10/1920 | Cnare | 33—80 |
| 1,498,485 | 6/1924 | Schmidtke | 33—107 |
| 2,098,695 | 11/1937 | Southwick | 324—121 X |
| 2,517,159 | 8/1950 | Allen | 33—111 X |
| 2,524,790 | 10/1950 | Grunwald | 33—107 |
| 2,599,861 | 6/1952 | Poole | 33—1 |

FOREIGN PATENTS

| | | |
|---|---|---|
| 16,608 | 1907 | Great Britain. |

LEONARD FORMAN, *Primary Examiner.*

ISAAC LISANN, H. N. HAROIAN, *Assistant Examiners.*